United States Patent
Raschke et al.

(10) Patent No.: US 8,881,311 B2
(45) Date of Patent: Nov. 4, 2014

(54) METHOD AND APPARATUS OF PHYSICAL PROPERTY MEASUREMENT USING A PROBE-BASED NANO-LOCALIZED LIGHT SOURCE

(71) Applicant: Bruker Nano, Inc., Santa Barbara, CA (US)

(72) Inventors: Markus B. Raschke, Boulder, CO (US); Stefan B. Kaemmer, Santa Barbara, CA (US); Stephen C. Minne, Santa Barbara, CA (US); Chanmin Su, Ventura, CA (US)

(73) Assignee: Bruker Nano, Inc., Santa Barbara, CA (US)

( * ) Notice: Subject to any disclaimer, the term of this patent is extended or adjusted under 35 U.S.C. 154(b) by 0 days.

(21) Appl. No.: 14/202,669

(22) Filed: Mar. 10, 2014

(65) Prior Publication Data

US 2014/0259234 A1  Sep. 11, 2014

Related U.S. Application Data

(60) Provisional application No. 61/775,166, filed on Mar. 8, 2013.

(51) Int. Cl.
*G01N 13/16* (2006.01)
*G01Q 60/00* (2010.01)
*G01Q 10/00* (2010.01)

(52) U.S. Cl.
CPC ...................................... *G01Q 10/00* (2013.01)
USPC ............ 850/32; 850/1; 850/5; 850/8; 850/21; 850/50; 850/52

(58) Field of Classification Search
CPC ...... G01Q 60/02; G01Q 60/50; Y10S 977/86; Y10S 977/873; Y10S 977/875; Y10S 977/85; Y10S 977/865; G01N 27/416; G01N 27/49; G01N 3/02; G01N 2203/0226; G01N 2230/0286
USPC .............................. 850/1, 5, 8, 21, 32, 50, 52
See application file for complete search history.

(56) References Cited

U.S. PATENT DOCUMENTS

| | | |
|---|---|---|
| 5,266,801 A | 11/1993 | Elings et al. |
| RE34,489 E | 12/1993 | Hansma et al. |
| 5,412,980 A | 5/1995 | Elings et al. |
| 6,260,997 B1 | 7/2001 | Claybourn et al. |
| 6,945,099 B1 | 9/2005 | Su et al. |

(Continued)

OTHER PUBLICATIONS

Berweger et al., Adiabatic Tip-Plasmon Focusing for Nano-Raman Spectroscopy, J. Phys. Chem. Letters, Nov. 2010, 3427-3432.

(Continued)

*Primary Examiner* — Nikita Wells
(74) *Attorney, Agent, or Firm* — Boyle Fredrickson S.C.

(57) ABSTRACT

An apparatus and method of performing physical property measurements on a sample with a probe-based metrology instrument employing a nano-confined light source is provided. In one embodiment, an SPM probe tip is configured to support an appropriate receiving element so as to provide a nano-localized light source that is able to efficiently and locally excite the sample on the nanoscale. Preferably, the separation between the tip apex and the sample during spectroscopic measurements is maintained at less than 10 nm, for example, using an AFM TR Mode control scheme.

20 Claims, 12 Drawing Sheets

(56) References Cited

U.S. PATENT DOCUMENTS

| | | | |
|---|---|---|---|
| 7,168,301 B2 | 1/2007 | Su et al. | |
| 7,497,613 B2 | 3/2009 | King et al. | |
| 7,960,695 B1 * | 6/2011 | Kley | 250/306 |
| 7,977,636 B2 * | 7/2011 | Raschke | 250/338.1 |
| 8,001,830 B2 | 8/2011 | Dazzi et al. | |
| 8,242,448 B2 * | 8/2012 | Prater et al. | 250/338.1 |
| 2006/0222047 A1 | 10/2006 | Reading | |
| 2009/0249521 A1 | 10/2009 | Dazzi et al. | |
| 2011/0205527 A1 | 8/2011 | Prater et al. | |

OTHER PUBLICATIONS

Berweger et al., Light on the Tip of a Needle: Plasmonic Nanofocusing for Spectroscopy on the Nanoscale, J. Phys. Chem. Letters, Mar. 2012, 945-952.

Neacsu et al., Near-Field Localization in Plasmonic Superfocusing: A Nanoemitter on a Tip, Nano Letters, Jan. 2010, 592-596.

Ropers et al., Grating-Coupling of Surface Plasmons onto Metallic Tips: A Nanoconfined Light Source, Nano Letters, 2007, vol. 7 No. 9, 2784-2788.

* cited by examiner

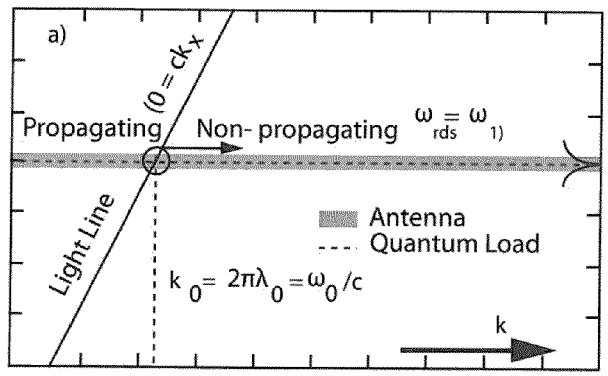
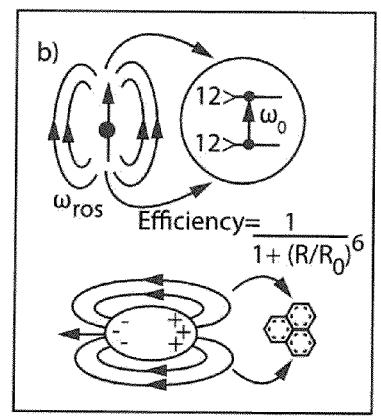
FIG. 10A        FIG. 10B
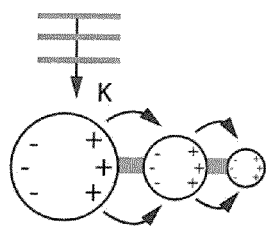
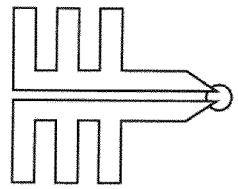
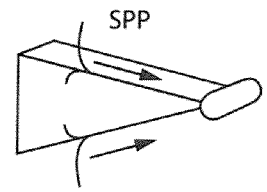
FIG. 11A        FIG. 11B        FIG. 11C

METHOD AND APPARATUS OF PHYSICAL PROPERTY MEASUREMENT USING A PROBE-BASED NANO-LOCALIZED LIGHT SOURCE

CROSS-REFERENCE TO RELATED APPLICATIONS

This application claims priority under 35 USC §1.119(e) to U.S. Provisional Patent Application Ser. No. 61/775,166, filed Mar. 8, 2013, entitled Method and Apparatus of Physical Property Measurement Using a Probe-Based Nano-Localized Light Source. The subject matter of this application is hereby incorporated by reference in its entirety.

BACKGROUND OF THE INVENTION

1. Field of the Invention

The preferred embodiments are directed to using a nano-localized light source to measure physical properties of a sample, and more particularly, to a method and apparatus of making nano-imaging and spectroscopy measurements using an atomic force microscope operating in either contact or a low amplitude mode, with the tip apex of the probe functioning as the nano-localized source.

2. Description of Related Art

The interaction between a sample under test and radiated energy can be monitored to yield information concerning the sample. In spectroscopy, dispersion of light from a sample into its component energies can be measured and, for example, intensity plotted as a function of wavelength. By performing this dissection and analysis of the dispersed light, users can determine the physical properties of the sample, such as temperature, mass and composition.

Notably, making spectroscopic measurements with a spatial resolution on the nanoscale is continuing to improve. But, as noted by Berweger et al, in *Adiabatic Tip-plasmon Focusing for Nano-Raman Spectroscopy*, J. Phys. Chem. Letters (November 2010) ("Berweger I"), the entirety of which is hereby incorporated by reference, despite ongoing progress in the development of imaging techniques with spatial resolution beyond the diffraction limit, simultaneous spectroscopic implementations delivering chemical specificity and sensitivity on the molecular level have remained challenging. Far-field localization techniques can achieve spatial resolution down to about 20 nm by point-spread function reconstruction, but typically rely on fluorescence from discrete molecular or quantum dot emitters, with limited chemically specific information. Scanning near-field optical microscopy (SNOM) provides sub-diffraction-limited resolution through the use of tapered fibers or hollow waveguide tips. However, aperture-limited and wavelength-dependent fiber throughput reduces sensitivity, generally making SNOM unsuitable for spectroscopic techniques that have low intrinsic signal levels.

In scattering-type SNOM (s-SNOM) external illumination of a sharp (metallic or semi-conducting) probe tip can enhance sensitivity, spectral range, and spatial resolution, as noted in Berweger. Chemical specificity can be obtained through the implementation of, for example, IR vibrational s-SNOM, tip-enhanced coherent anti-Stokes Raman spectroscopy (CARS), or tip-enhanced Raman scattering (TERS). Here the antenna or plasmon resonances of the (noble) metal tips can provide the necessary field enhancement for even single-molecule sensitivity.

In the standard implementation, however, the direct illumination of the tip apex results in a three-to-four orders of magnitude loss in excitation efficiency, related to the mode mismatch between the diffraction-limited far-field excitation focus and the desired tens of nanometers near-field localization, as determined by the tip apex radius. The resulting loss of sensitivity, together with a far-field background signal, often limit contrast and may cause imaging artifacts, presenting challenges for the general implementation of a wider range of spectroscopic techniques in s-SNOM.

A general solution for optical nano-imaging and spectroscopy thus requires a true nano-localized light source. While this can be achieved through a nanoscopic emitter in the form of a single molecule, quantum dot, or nano structure at the apex of a tip, that approach relies on the quantum efficiency and spectral characteristics of the emitter, and the difficulties of overcoming the intrinsic background and sensitivity limitations with unmatched far-field mode excitation remain.

In one known technique, a nanoemitter is generated through nonlocal excitation, taking advantage of the effective tip cone radius-dependent index of refraction n(r) experienced by a surface plasmon polariton (SPP) propagating along the shaft of a noble metal tip. The resulting propagation-induced adiabatic SPP focusing into the tip apex region is due to the continuous transformation of the surface mode size. This approach allows for SPP coupling spatially separated from the tip apex, and subsequent probe apex excitation via the propagating SPP, with tens of nanometers field confinement over a broad spectral range with high focusing efficiency.

As further noted in Berweger, the use of a photonic crystal microresonator as a coupling element on a tip has previously been used to demonstrate TERS. As explained by the authors, it was believed that the geometric constraints of the cantilever-based design made the study of opaque samples difficult, and the collinear excitation and residual hole-array transmission did not yet fully eliminate the far-field background. In a known analogous but simplified approach, a grating-coupler was employed to launch SPP modes onto the shaft of monolithic gold (Au) tips. The conical tips with two-stage optical mode matching of the far-field. SPP coupling and the mechanisms of adiabatic SPP field concentration into the tip apex represent a unique optical antenna concept for the efficient far-field transduction into nanoscale excitation.

As shown in FIG. 1, the nanofocusing process can be implemented by employing an etched tip and using side-illumination grating coupling. A schematic image of an electrochemically etched Au probe tip 200 with plasmonic grating 206 is shown. An optical image 208 is superimposed on the illustration showing the illumination of grating 206 with a far-field focus for launching SPPs, which then propagate non-radiatively along the shaft or body 202 of tip 200, with corresponding localized emission from the nanofocused field at the tip apex 204 (the energy is collected and concentrated at the apex as a localized source, represented schematically with a dimension "d"). The apex-emitted light follows a $\cos^2(\theta)$ polarization dependence, as expected for a nanoscopic dipolar emitter located at the tip apex. These results confirm the expected mode filtering of the nanofocusing process, as only the radially symmetric m=0 SPP mode will produce purely axial dipole emission, due to destructive interference of the radial polarization components.

One promising technology for improving spectroscopic measurement performance is scanning probe microscopy. Scanning probe microscopes (SPMs), such as the atomic force microscope (AFM), are devices which typically employ a probe having a tip and causing the tip to interact with the surface of a sample with appropriate forces to characterize the surface down to atomic dimensions. Generally, the probe is introduced to a surface of a sample to detect changes in the characteristics of a sample. By providing relative scanning movement between the tip and the sample, surface characteristic data can be acquired over a particular region of the sample and a corresponding map of the sample can be generated.

A typical AFM system is shown schematically in FIG. 2. An AFM 10 employing a probe device 12 including a probe 14 having a cantilever 15. Scanner 24 generates relative motion between the probe 14 and sample 22 while the probe-sample interaction is measured. In this way images or other measurements of the sample can be obtained. Scanner 24 is typically comprised of one or more actuators that usually generate motion in three orthogonal directions (XYZ). Often, scanner 24 is a single integrated unit that includes one or more actuators to move either the sample or the probe in all three axes, for example, a piezoelectric tube actuator. Alternatively, the scanner may be an assembly of multiple separate actuators. Some AFMs separate the scanner into multiple components, for example an XY scanner that moves the sample and a separate Z-actuator that moves the probe. The instrument is thus capable of creating relative motion between the probe and the sample while measuring the topography or some other surface property of the sample as described, e.g., in Hansma et al. U.S. Pat. No. RE 34,489; flings et al. U.S. Pat. No 5,266,801; and Elings est al, U.S. Pat. No. 5,412,980.

In a common configuration, probe 14 is often coupled to an oscillating actuator or drive 16 that is used to drive probe 14 at or near a resonant frequency of cantilever 15. Alternative arrangements measure the deflection, torsion, or other motion of cantilever 15. Probe 14 is often a microfabricated cantilever with an integrated tip 17.

Commonly, an electronic signal is applied from an AC signal source 18 under control of an SPM controller 20 to cause actuator 16 (or alternatively scanner 24) to drive the probe 14 to oscillate. The probe-sample interaction is typically controlled via feedback by controller 20. Notably, the actuator 16 may be coupled to the scanner 24 and probe 14, but may be formed integrally with the cantilever 15 of probe 14 as part of a self-actuated cantilever/probe.

Often, a selected probe 14 is oscillated and brought into contact with sample 22 as sample characteristics are monitored by detecting changes in one or more characteristics of the oscillation of probe 14, as described above. In this regard, a deflection detection apparatus 25 is typically employed to direct a beam towards the backside of probe 14, the beam then being reflected towards a detector 26. As the beam translates across detector 26, appropriate signals are transmitted to controller 20, which processes the signals to determine changes in the oscillation of probe 14. In general, controller 20 generates control signals to maintain a relative constant interaction between the tip and sample (or deflection of the lever 15), typically to maintain a setpoint characteristic of the oscillation of probe 14. For example, controller 20 is often used to maintain the oscillation amplitude at a setpoint value, $A_S$, to insure a generally constant force between the tip and sample. Alternatively, a setpoint phase or frequency may be used.

A workstation is also provided, in the controller 20, and/or in a separate controller or system of connected or stand-alone controllers, that receives the collected data from the controller and manipulates the data obtained during scanning to perform point selection, curve fitting, and distance determining operations.

AFMs may be designed to operate in a variety of modes, including contact mode and oscillating mode. Operation is accomplished by moving either the sample or the probe assembly up and down relatively perpendicular to the surface of the sample in response to a deflection of the cantilever of the probe assembly as it is scanned across the surface. Scanning typically occurs in an "x-y" plane that is at least generally parallel to the surface of the sample, and the vertical movement occurs in the "z" direction that is perpendicular to the x-y plane. Note that many samples have roughness, curvature and tilt that deviate from a flat plane, hence the use of the term "generally parallel." In this way, the data associated with this vertical motion can be stored and then used to construct an image of the sample surface corresponding to the sample characteristic being measured, e.g., surface topography. In one mode of AFM operation, known as TappingMode™ AFM (TappingMode™ is a trademark of the present assignee), the tip is oscillated at or near a resonant frequency of the associated cantilever of the probe. A feedback loop attempts to keep the amplitude of this oscillation constant to minimize the "tracking force," i.e. the force resulting from tip/sample interaction. Alternative feedback arrangements keep the phase or oscillation frequency constant. As in contact mode, these feedback signals are then collected, stored, and used as data to characterize the sample. Note that "SPM" and the acronyms for the specific types of SPMs, may be used herein to refer to either the microscope apparatus or the associated technique, e.g., "atomic force microscopy."

Regardless of their mode of operation, AFMs can obtain resolution down to the atomic level on a wide variety of insulating or conductive surfaces in air, liquid, or vacuum, by using piezoelectric scanners, optical lever deflection detectors, and very small cantilevers fabricated using photolithographic techniques. Because of their resolution and versatility, AFMs are important measurement devices in many diverse fields ranging from semiconductor manufacturing to biological research.

In one embodiment employing an AFM for optical excitation and detection, the system provides side-on illumination of the tip shaft (body) of a tip, supporting a grating. The electrochemically etched tips may be mounted onto an AFM quartz tuning fork, and the grating is fabricated via focused ion beam (FIB) milling. But such known systems have limitations. For example, the tip-sample coupling relationship is complex and can, for example, result in a loss of excitation enhancement due to the broad k-vector distribution at the apex allowing for launching propagating SPPs at the sample surface. This is suggested by reduced fundamental apex emission often observed upon approach of an Au tip surface. Also, use of electrochemically etched tips is limited to shear force microscopy (tuning fork tips—difficult to implement tip-sample modulation with these). As a result, the AFM modes available for simultaneous and sensitive topographic, phase, and other state of the art AFM functions is severely limited. Electrochemically etched tips are also difficult to mass produce, and their reproducibility is limited. In addition, the materials that can be used to produce the tips are limited. Electrochemical etching allows for the fabrication of sharp tips with only certain metals, such as gold, silver, or tungsten. And with large amplitude AFM modes, the tip is removed from the optical near-field during spectral acquisition, thus producing a weaker spectroscopic signal as the tip on average is further away from the sample.

As a result, improvements were needed to expand the range and efficiency of performing optical nanoimaging and spectroscopy on the nanoscale.

SUMMARY OF THE INVENTION

Efficiency of optically making physical property measurements on a sample is facilitated by employing a combination of an atomic force microscope (AFM) capable of maintaining a tip-sample separation sufficiently small with SPM tips designed with a unique geometry (e.g., waveguide) that can be used to transform a quasi-planar SPP mode coupled via a receiving element into a spatially confined excitation source. In a preferred embodiment, the so-called torsional resonance mode (TR Mode) may be used to maintain tip-sample separation less than. 100 nm, though Tapping Mode AFM using low amplitude oscillation may also be employed. Combined with the described antenna concept, the preferred embodiments provide highly efficient generation of nano-localized excitations with an inherently broad operational bandwidth and only a weak wavelength dependence. In a scanning probe microscope, this allows for nearly background-free s-SNOM imaging with any spectroscopic techniques, and associated chemical specificity. The preferred embodiments are usable in spectroscopy set-ups, as well as in nano-imaging applications employing a set wavelength.

In the present preferred embodiments, an SPM probe includes a cantilever and a tip, with the tip positioned at the distal end of the cantilever, and including a) a shaft and b) an apex positioned adjacent to a sample. A receiving element is provided and supported by the shaft of the tip. A source of electromagnetic wave excitation directs electromagnetic waves toward the receiving element, the electromagnetic wave being coupled to the apex via the receiving element. The coupled electromagnetic excitation at the apex is locally enhanced and interacts with the sample. A controller maintains a separation between the apex and the sample greater than zero nanometers and less than 100 nm during electromagnetic wave excitation.

In accordance with a further aspect of the preferred embodiments, the controller maintains the separation using torsional resonance mode (TR Mode) feedback.

According to another aspect of the preferred embodiments, the controller maintains the separation at less than 5 nm using tapping mode, wherein a tapping mode setpoint amplitude is between about 0.1 nm and 10 nm.

In another aspect of the preferred embodiments, the shaft has a continuous surface around its entire periphery, and the continuous surface is at least one of a conical surface and an elliptical surface. A pyramid shape may alternatively be employed.

In a further aspect of the preferred embodiments, the receiving element is supported by the tip, and is one of a surface grating, a prism, a photonic crystal, a waveguide, and an optical antenna, or any other structure or material suitable to achieve the coupling of the incident electromagnetic wave which yields the excitation of the apex.

According to another aspect of the preferred embodiments, the apex comprises a conductive metal, or any other material suitable to interact with the electromagnetic wave in order to achieve the apex excitation, such as a highly doped semiconductor, and has a radius between about 1 and 100 nm.

Further, the source of electromagnetic wave excitation is one of a) a laser operated at a wavelength in the UV to near-IR spectral range (about 300 to 1200 nm) (e.g., to induce a Raman shift), and b) an IR source operating at a wavelength equal to about 2-30 μm.

In another aspect of the preferred embodiments, the locally enhanced signals are used in at least one of a spectroscopic measurement and a nano-imaging measurement.

A method configured in accordance with the preferred embodiments includes optically measuring a physical property of a sample by providing an AFM including a probe having a cantilever and a tip supported at about a distal end of the cantilever, the tip including a shaft and an apex. The method also includes providing a receiving element supported by the shaft of the tip, and a source of electromagnetic wave excitation. Next, electromagnetic waves are directed from the source toward the receiving element, and the electromagnetic waves are coupled from the receiving element to the apex to produce locally enhanced fields that interact with the sample. Finally, the method includes controlling a separation between the apex and the sample to be greater than zero nanometers and less than 100 nm during electromagnetic wave excitation.

In another aspect of the preferred embodiments, the controlling step maintains the separation using at least one of a) torsional resonance mode (TR Mode) feedback, b) tapping mode feedback, wherein a setpoint amplitude associated with the tapping mode feedback is between about 0.1 nm and 10 nm, and c) contact mode feedback.

According to another aspect of the preferred embodiments, the receiving element provides adiabatic plasmon focusing to produce the locally enhanced signals and is at least one of a surface grating, a prism, a photonic crystal, a waveguide, and an optical antenna.

In another aspect of the preferred embodiments, the controlling step maintains the separation at less than 5 nm using at least one of torsional resonance mode (TR Mode) and tapping mode operated at a setpoint amplitude between about 0.1 nm and 10 nm.

In another preferred embodiment, an SPM includes a probe including a cantilever with a tip, the tip having a shaft and an apex. The SPM also includes a receiving element supported by the probe, and a remote source of electromagnetic wave excitation that directs electromagnetic waves toward the receiving element, the receiving element providing adiabatic plasmon focusing of the electromagnetic waves to excite the apex and produce locally enhanced excitation that is coupled to a sample, the locally enhanced excitation being comprised entirely of the focused electromagnetic waves. A controller maintains a separation between the apex and the sample greater than zero nanometers and less than 100 nm.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout and in which:

FIG. 10A is a plot of a dispersion relationship of a localized plasmon resonance (optical antenna) and an ideal, point dipole;

FIG. 10B is a schematic illustration of the near-field dipole-dipole coupling between the antenna and nanoscale quantum system, for example;

FIG. 11A-11C are schematic illustrations of probe shapes usable in the preferred embodiments;

DETAILED DESCRIPTION OF THE PREFERRED EMBODIMENTS

An improved apparatus and method of performing nano-image and spectroscopic measurements efficiently and locally on the nanoscale is shown and described. In one embodiment, sharp tipped probes employed in a conventional metrology instrument, such as an atomic force microscope (AFM), are configured to provide a top-down nano-localized light source. Rather than using far-field light which has a low density of states (essentially only one mode), the nano-localized light source of the preferred embodiments provides a localized optical dipole of high intensity. The concept is akin to Förster resonance energy transfer (FRET), which looks at the energy transfer from one excited dye molecule (chromophore) to another to measure distances between the molecules. In analogous fashion, the nano-localized light source employed in the preferred embodiments is used as on an SPM probe to provide highly efficient excitation of the sample, thus allowing the preferred embodiments to make spectroscopic measurements efficiently and on a highly localized scale. Efficiency is further facilitated by preferably maintaining close separation between probe apex and the sample by operating the AFM in a low amplitude mode, such as torsional resonance mode (TR Mode), contact mode or Tapping Mode with an amplitude between about 0.1 nm and 10 nm.

Figure 3:
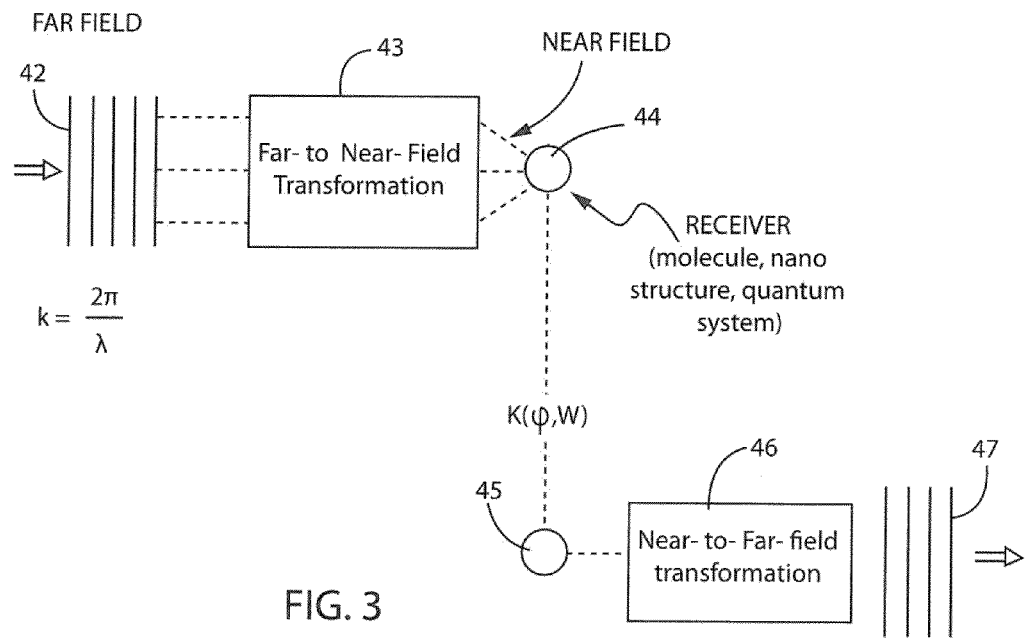
FIGS. 3 and 4 are schematic illustrations of a system for converting far-field radiation to near field excitation, with light input (FIG. 3) and electrical power input (FIG. 4)
Figure 4:
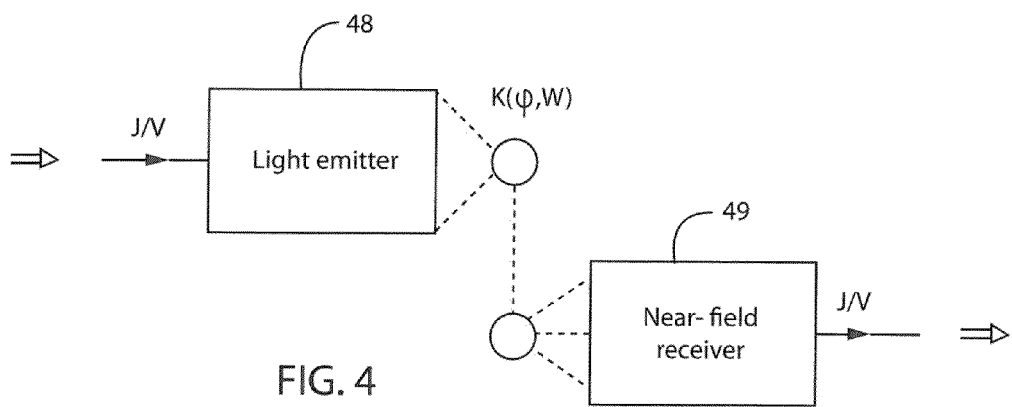

Most generally, turning to FIGS. 3 and 4, the preferred embodiments are able to take a standard input (e.g., electromagnetic wave excitation such as illumination) and bring the associated energy to the near field for localized spectroscopy. In the system of FIG. 3, far-field electromagnetic radiation 42 having a wave number $2\pi/\lambda$ is input to a Far-to Near-Field transformation block 43. The near-field radiation can then be received by an appropriate receiving element 44, such as a molecule, nano structure, quantum system, etc., for exciting a corresponding spectroscopic measurement. The scattered near-field energy is collected by element 45 and transmitted to an associated Near- to Far-field transformation block 46 that outputs far-field energy 47 for processing, i.e., ultimate detection and analysis of sample properties.

In the system of FIG. 4, electrical energy (J/V) is used as the input. This energy is input to, for example, a light emitter 48 that transmits electromagnetic energy to antennas for transmission to a near field receiver 49 for conversion of the energy to the near-field. The near-field receiver, similar to the system of FIG. 3, can be a molecule, nano structure, quantum system, etc. for performing localized spectroscopy.

Figure 1:
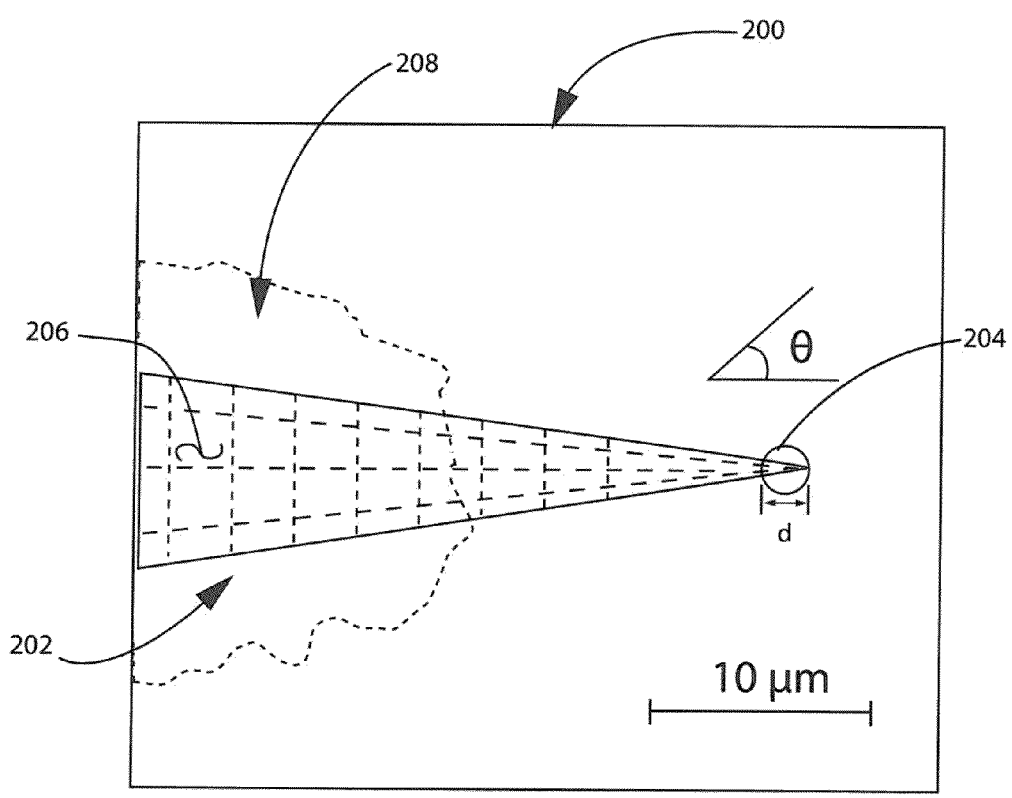
FIG. 1 is a schematic illustration of a nano-localized light source of the Prior Art.
Figure 2:
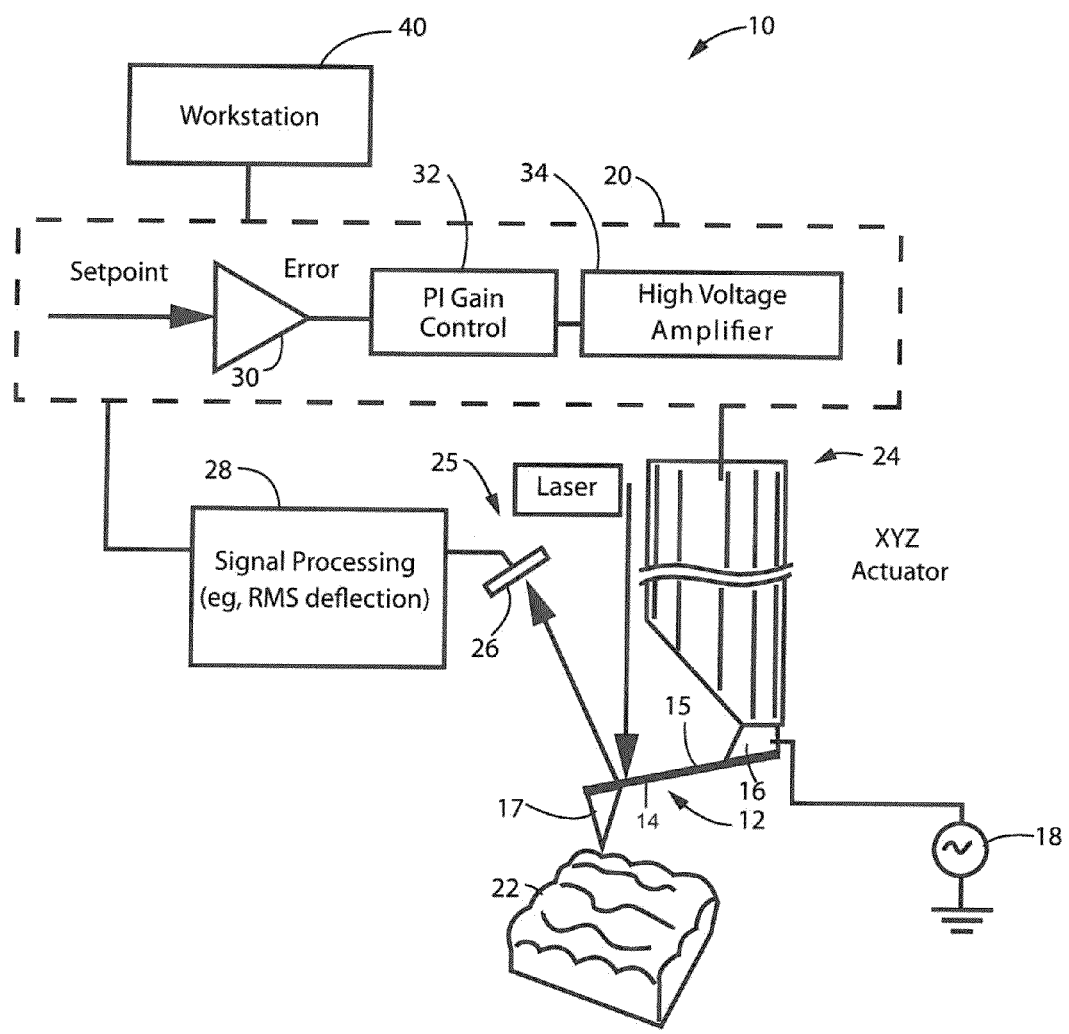
FIG. 2 is a schematic illustration of a Prior Art atomic force microscope AFM.
Figure 5:
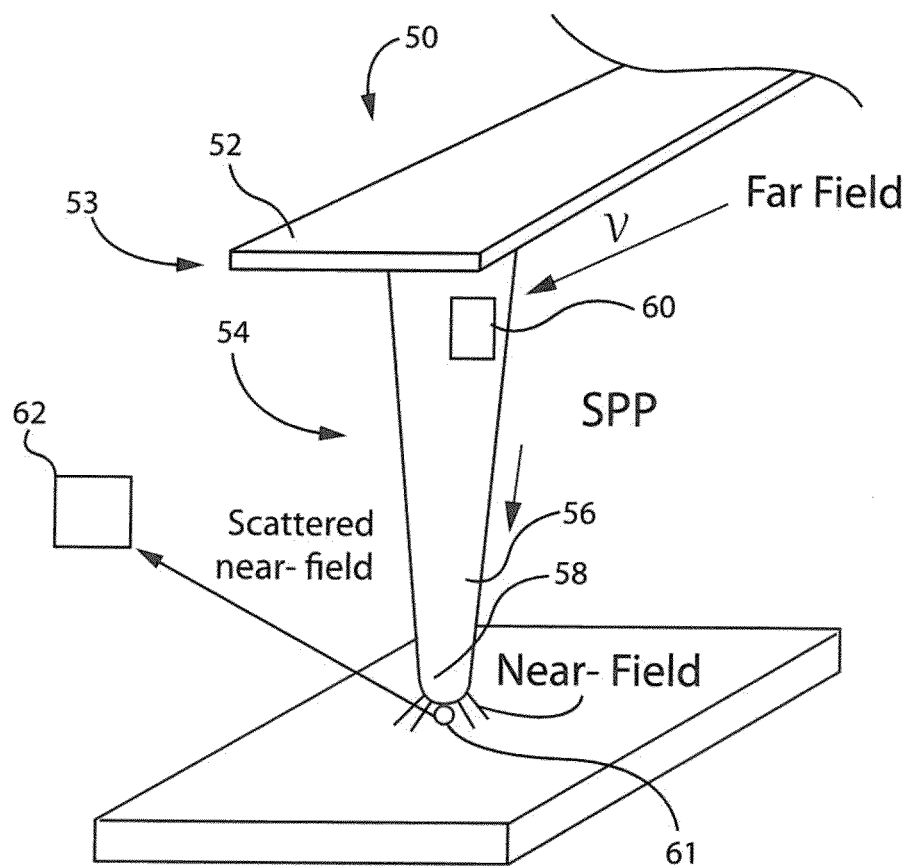
FIG. 5 is a schematic perspective illustration of a nano-localized light source generated at the apex of a tip of an AFM cantilever probe, according to a preferred embodiment.

A schematic illustration of a preferred implementation of such a system, including the production of a nano-localized source, is provided in FIG. 5. In this case, the probe based optical antenna shown in FIG. 1 is employed as part of a AFM-type cantilever probe 50. More particularly, a tip 54 of probe 50 is coupled to a distal end 53 of a cantilever 52 of probe 50 and operates as the antenna (nano-localized source). Tip 54 includes a shaft 56 and an apex 58, with shaft 56 supporting a receiving element 60. In this way, in contrast to known systems that employ tuning fork probes (shear force microscopy), AFM functions, such as measuring topography and phase, can be performed with the same instrument, simultaneously.

The preferred embodiments provide side-on illumination (Far Field) of tip shaft (body) 56, with shaft 56 supporting receiving element 60, such as a surface grating, a prism, a photonic crystal, a waveguide, or an optical antenna. Receiving element 60 facilitates the collection of the electromagnetic waves which propagate clown shaft 56 of tip 54 toward apex 58, i.e., launch of a surface plasma polariton (SPP). The nano-localized source is realized at apex 58 with no direct illumination of the sample, i.e., the localized near-field energy that interacts with the sample can be generated entirely with indirect illumination of the probe. The corresponding Near-Field interacts with a sample 61 being examined, and as this Near-Field interacts with sample 61, the scattered light ("Scattered near-field") is detected, for example, using 90° sagittal detection with detector 62, as shown schematically in FIG. 5.

Figure 6:
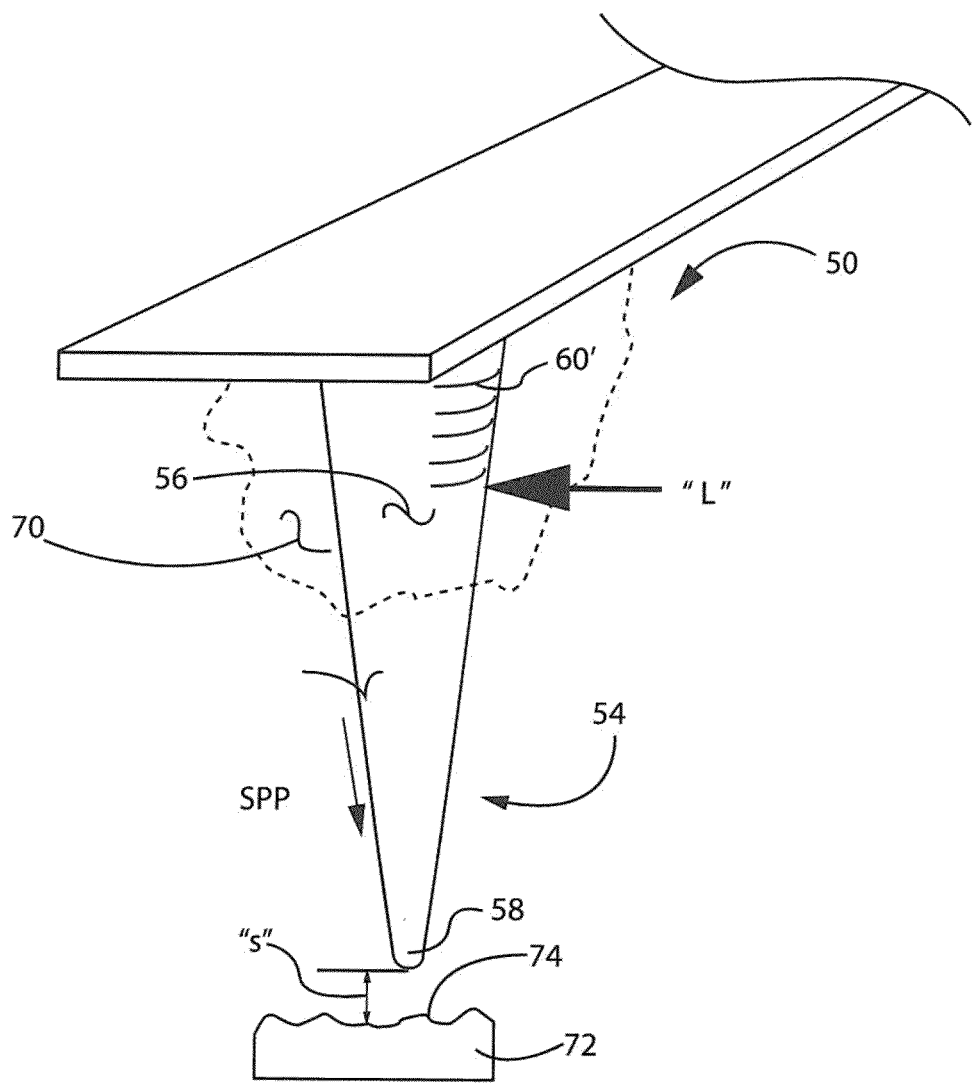
FIG. 6 is a schematic illustration of the nano-localized light source of FIG. 5, showing a grating-type receiving element.

A schematic illustration of a gold (Au) tip 54 with grating 60' supported by shaft 56 is shown in FIG. 6, superimposed with a far-field optical image 70 of grating illumination upon excitation by far field illumination, "L." The production of the nano-localized source includes the effect of grating-coupling, SPP propagation, and ultimately nano-localized tip apex emission. Positioning the AFM probe 50 adjacent to a surface 74 of a sample 72 allows the nano-localized source to interact with the sample so spectroscopic and nano-imaging measurements may be made. The distance "s" between apex 58 and sample surface 74 is preferably maintained at less than 100 nm to insure efficient coupling and maximize resolution. Low-amplitude AFM modes are used to achieve this result, as described further below.

Figure 7:
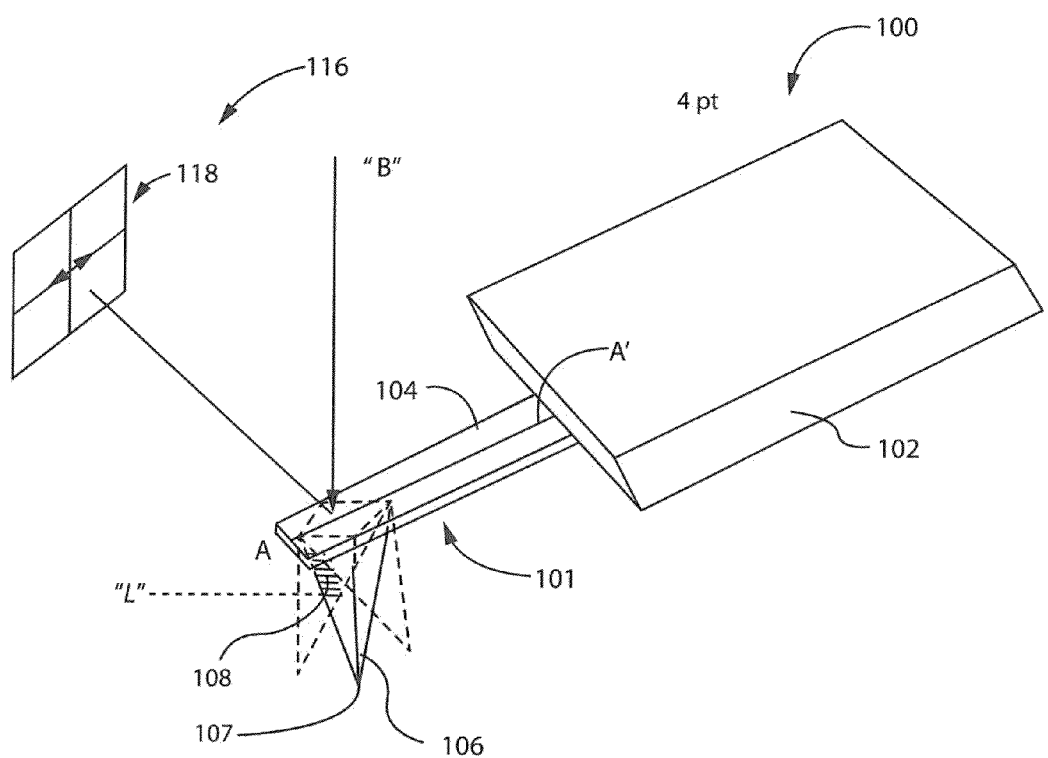
FIG. 7 is a schematic perspective illustration of the nano-localized light source of FIG. 6, employed in an AFM operating in torsional resonance mode (TR Mode).
Figure 8:
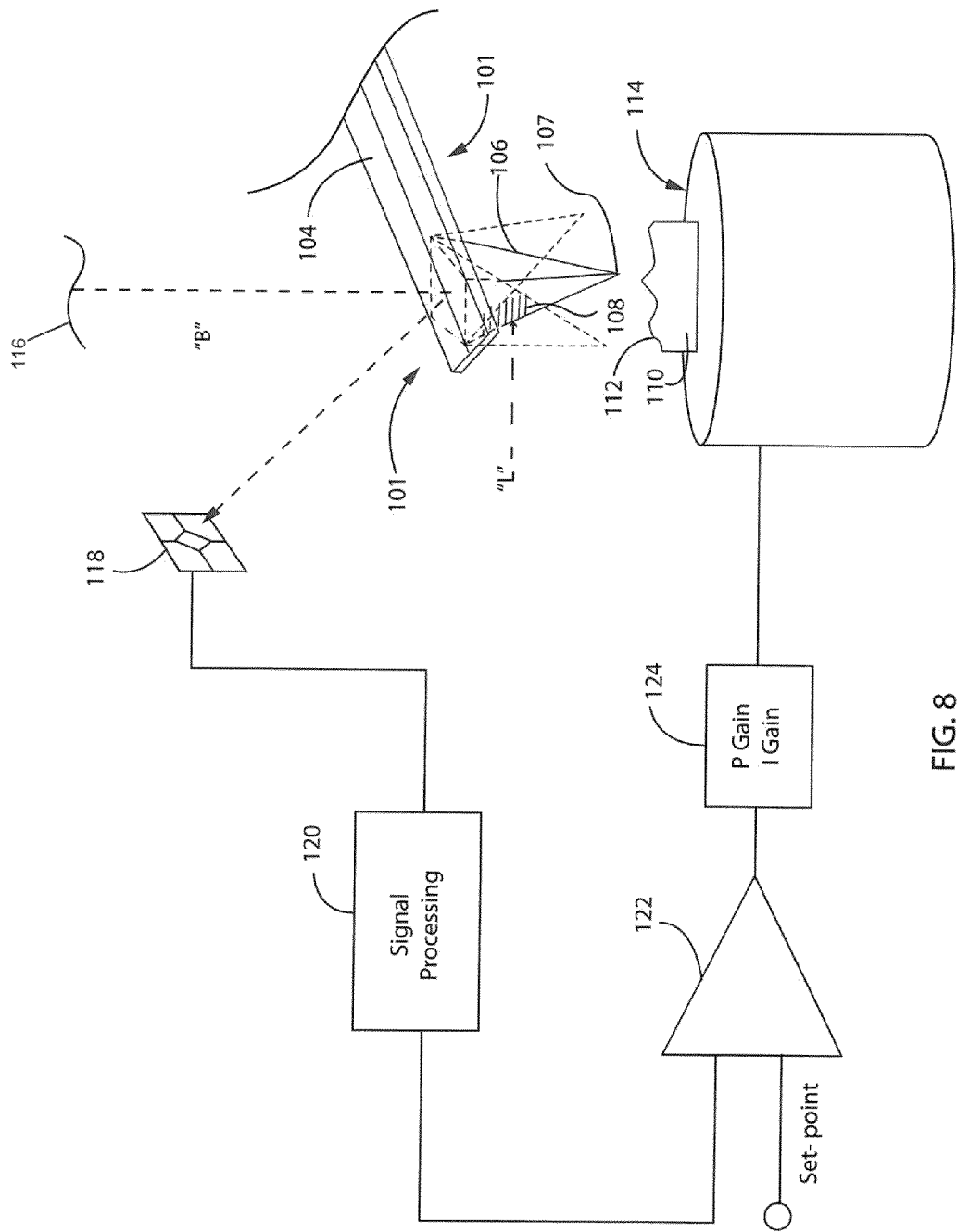
FIG. 8 is a schematic block diagram of a TR Mode AFM employing the nano-localized light source of FIG. 6.

In FIGS. 7 and 8, a system set-up for one preferred mode of AFM operation to maintain tip-sample separation at less than 100 nm is illustrated. In torsional resonance mode (TR Mode), a probe assembly 100 includes a probe 101 and a base 102. Probe 101 includes a cantilever 104 and a tip 106 supported at the distal end of lever 104 and having an apex 107. In this case, tip 106 includes a receiving element 108 (e.g., a grating), toward which electromagnetic wave excitation "L" is directed.

In TR Mode, at least the tip 106, and preferably the entire cantilever motion of probe 101 is initially driven into oscillation at or near a torsional resonance of the probe using any of the techniques described in U.S. Pat. Nos. 6,945,099 and 7,168,301, owned by the present applicant, the entirety of each of which is expressly incorporated by reference herein. The motion of the tip is as schematically shown (phantom), which is rotation substantially about longitudinal axis A' of cantilever 104. The separation between tip 106 and sample 110 (FIG. 8) is then reduced (e.g. by exciting actuator 114 in Z) to cause the two to interact. A beam of light "B" generated by probe oscillation detection system 116 is directed towards a back of cantilever 104 so that it is reflected therefrom. The reflected beam is then sensed by a detector 118. Preferably, detector 118 is a quadrature (i.e., four-cell) photodetector.

With further reference to FIG. 8, torsional resonance control is illustrated. Torsional oscillation is detected by detector 118, which outputs signals indicative of interaction between probe tip 107 and sample surface 112. A signal processing block 120 conditions the probe motion signals for comparison to a set-point associated with TR Mode oscillation in block 122. An appropriate gain is applied by block 124 to command appropriate motion of actuator 114 supporting sample 110 to maintain probe oscillation at the TR Mode set-point. This low-amplitude mode of AFM operation is effective at maintaining tip-sample separation at the desired distance (e.g., less than 100 nm), important to insuring good coupling between the enhanced optical excitation emitted at the tip during the above-described electromagnetic excitation.

As an alternative, tapping mode AFM may be employed. In this case, low amplitude oscillation should be maintained so tip-sample separation is maintained at less than 100 nm. Preferably, the amplitude of the tapping mode drive should be set to be within a range of about 0.1 nm and 10 nm. Finally, in contact mode, the tip and sample remain "in contact," as understood in the art. This insures tip-sample separation is maintained within the 100 nm parameter yielding superior spectroscopic signals, and nano-scale resolution. Ultimately, data quality is improved, given greater sensitivity compared to simply illuminating the probe apex, as in previous systems.

Figure 9:
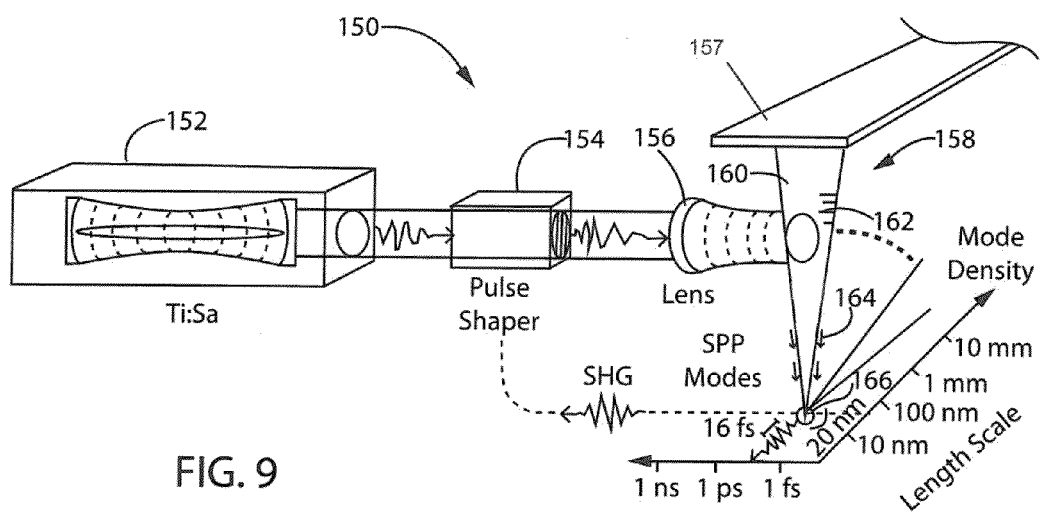
FIG. 9 is an AFM set-up using a nano-localized light source, including ultrafast pulse shaping and broadband grating nanofocusing.

Turning to FIG. 9, plasmonic nanofocusing in combination with frequency-domain pulse shaping allows for the generation of ultrashort pulses in the nano-localized region of the tip apex, as illustrated. A nano-localized source 150 includes an originating pulsed laser 152 (Ti:Sa) that outputs radiation to a pulse shaper 154 that conditions the radiation prior to focusing by a lens 156. The output of lens 156 is directed generally orthogonally to the shaft or body 160 of a tip 158 extending from the distal end of a cantilever 157 of the AFM probe. A grating 162 disposed on shaft 160 facilitates generation of the SPP 164 toward the tip apex 166.

Full characterization and control of the nanofocused pulses is achieved through the local second-harmonic generation (SHG) resulting from the broken axial symmetry of the tip apex, providing access to the spectral phase at this point. A nanofocused pulse measured at the tip-apex with its intensity and phase reconstructed from interferometric frequency resolved optical gating (FROG). The temporal duration of the pulse with a spectral width of ~60 nm is found to be ~16 fs and transform-limited after optimization using a multi-photon intrapulse interference phase scan algorithm (MIIPS).

With the nanofocusing mechanism being to first order independent of wavelength and spectral phase, it not only allows for achieving the shortest possible pulse duration, but also for generation of arbitrary optical waveforms at the apex through deterministic pulse shaping, only limited by the spectral bandwidth at the apex. For tips exhibiting a localized plasmon resonance at the apex near the laser frequencies, plasmon dephasing times of $T_2 \approx 20$ fs are expected to provide a lower limit for the achievable apex pulse duration. For non-resonant tips, the shortest attainable nanofocused pulse duration is determined by the spectral bandwidth available.

With more specific reference to the characteristics of probe 50, shaft 56 preferably has a continuous surface around its entire periphery to insure efficient propagation of the SPP. In this regard, the cross-section of the shaft is preferably conical or elliptical. Receiving element 60 (FIG. 5) can either have dimension (like a prism) or comprise a grating, as discussed previously. The radius of apex 58 is preferably in the range of 1 nm to 100 nm. While the composition of the probe may have a variety of characteristics, the apex material is important. Apex 58 is preferably made of a conductive metal, or of silicon with a metal coating, such as gold (Au), silver (Ag), aluminum (Al), or other suitable metal. Electromagnetic wave excitation (e.g., "L" in FIG. 6) can be a laser with an excitation wavelength for Raman shift, or an IR laser having a wavelength range of about 2-30 µm.

The tip-scattered Raman light generated by the localized apex plasmon may be spectrally filtered and detected using a grating spectrometer. Confocal spatial filtering of the apex emission prevents residual grating-scattered light from reaching the spectrometer. Analyte molecules may be deposited by spin coating from solution onto an evaporated Au surface, providing additional field enhancement from plasmonic tip-sample coupling.

As noted in Berweger I, the tip cone angle of ~15° corresponds to a maximum nanofocusing efficiency at ≅800 nm, yet with broad wave-length range.

The side-on illumination geometry (rather than under sample illumination) allows the surfaces of thick, bulk and nontransparent samples to be studied. Furthermore, using AFM with interaction forces on the order of 10's of pN (for example, low amplitude tapping mode AFM) provides a reduced force perturbation of the sample by several orders of magnitude. Notably, the grating 60' may be fabricated via focused ion beam (FIB) milling, with the grating period ao determined by the in-plane momentum conservation condition $k_{SPP}=k_{in}+nG$, with integer n and $G=2\pi/ao$.

Notably, although comparable near-field signal levels for both the grating illumination TERS and direct apex illumination TERS are found, the background signal, its origin, and the resulting contrast are fundamentally different. For direct apex illumination, the residual background of the TERS signal (with the tip retracted) originates from the elliptical diffraction-limited far-field focus with major and minor radii of ~2 and 1 µm, respectively. In contrast, for grating illumination of the same tip, no tar-field Raman background is observed as a result of the intrinsic nanometer-scale spatial field confinement achieved by the SPP propagation-induced nanofocusing at the apex.

Generation of Nano-Localized Source (Conical Antenna)

As noted in Berweger et al. *Light on the Tip of Needle: Plasmonic Nanofocusing for Spectroscopy on the Nanoscale*, J. Phys. Chem. Letters (March 2012) (hereinafter "Berweger II"), the entirety of which is incorporated by reference herein, efficient, reproducible, scalable, and tunable focusing of light into the nanoscale for enhanced spectroscopy and imaging has remained challenging. While in principle the diffraction-limited size of a far-field focus is well matched to the absorption cross-section of an ideal resonant dipolar quantum absorber of 3ë2/2ó, molecular cross-sections are typically limited by non-radiative decoherence via intra- and inter-molecular coupling to approximately the geometric size of the molecule. Overcoming this mode mismatch is the goal of using optical antennas, which have evolved from the uncontrolled yet high electromagnetic field enhancement in rough SERS substrates, to controllable, yet often still inefficient antenna devices to mediate and drive the interaction between free-space light and molecular or nanoscale excitations.

Optical antennas are conceptually analogous to RF antennas: first, a propagating far-field wave is absorbed by the antenna and transduced into a wire-bound and guided electrical current. Second, the antenna current at RF frequencies is then transferred to and converted by the load. Extension of this concept to optical frequencies is complicated by low electrical conductivities leading to large ohmic losses, and the lack of analogous discrete circuit elements preventing optimal impedance matched conditions.

Construction of an optical antenna in this regard preferably employs the use of noble metal nanoparticles exhibiting strong polarizabilities at optical frequencies arising from localized (electronic) surface plasmon polariton (SPP) resonances. As illustrated in FIG. 10A, this in principle enables the transformation of far-field modes with a single free-space wavevector $k=0=2\pi\lambda_0=\omega_0/c$ into spatially localized evanescent modes with correspondingly large wavevector distributions (red). Through the mode overlap of the large wavevector distribution with that of the induced molecular point dipole as the load, electromagnetic energy transfer occurs via evanescent dipole-dipole coupling as illustrated in FIG. 10B. The efficiency of this process then depends on the antenna-to-load separation R analogous to, e.g., Förster resonant energy transfer (FRET) between two chromophores, with the transfer efficiency $1/(1+(R/R_0)^6)$ and typical values of the Förster distance $R_0$ of a few nanometers, depending on spectral overlap and relative orientation. Via reciprocity the reverse process is also facilitated, i.e., enhanced radiative antenna-coupled molecular emission.

Due to the high field localization and enhancement generally enabled by plasmon resonances, optical antennas have found widespread applications for sensing and spectroscopy, most notably in surface enhanced spectroscopies such as Raman scattering (SERS), infrared absorption (SEIRA), and coherent nonlinear optics such as second-harmonic generation (SHG). All-optical imaging with nanometer spatial resolution is enabled by scattering-type scanning near-field optical microscopy (s-SNOM), and its plasmon-enhanced variant tip-enhanced Raman scattering (TERS) can yield single molecule sensitivity. However, despite much progress, significant difficulties had persisted for providing a generalizable nanofocusing concept.

While the absorption cross section (effective area) of plasmonic nanoparticles can approach the theoretical limit of RF dipole antennas of óRF, dip=0.13ё2, increasing ó beyond the dipole limit by, for example, increasing the volume of the plasmonic structure, results in reduced spatial field localization due to smaller associated wavevectors. The intrinsically low Q-factors (on the order of 10) arising from short plasmon dephasing times T2, while providing broad bandwidth, limit the local field enhancement F α T2. In order to overcome the limited cross sections of single or simple coupled plasmonic nanostructures, gradual mode transformations based on cascaded structures and focusing propagating SPP modes into structural singularities such as wedges and grooves have been proposed, as well as the extension of classical antenna concepts such as coplanar strip lines and phased array antennas, as illustrated in FIGS. 11A-11C. While improved performance can be achieved with gradual or multi-step mode transformations, the use of resonant structures and nanoparticles remains limited in efficiency due to scattering and radiation losses at the structural discontinuities and coherent nonlinear optics such as second-harmonic generation (SHG). All-optical imaging with nanometer spatial resolution is enabled by scattering-type scanning near-field optical microscopy (s-SNOM), and its plasmon-enhanced variant tip-enhanced Raman scattering (TERS) can yield single molecule sensitivity. However, despite much progress, significant difficulties had persisted for lack of a generalizable nanofocusing concept. (see Berweger II)

As discussed in Berweger I and II, and elsewhere, in using AFM to perform the spectroscopic measurements, the probe is configured as a 3D regularly tapered conical waveguide, thereby providing a nano-localized light source and overcoming the limitations described with respect to the art. Its unique topology possesses no structural discontinuities except at the apex, thus minimizing all scattering losses. This allows for a continuous surface plasmon polariton (SPP) mode transformation taking advantage of a radius-dependent effective index of refraction (neff(r) $\infty 1/r$ for r<<λ0) experienced by SPP's propagating on the outside surface of the structure. The increasing index of refraction leads to a decreasing SPP wavelength, thus avoiding scattering loss as the taper narrows, allowing efficient generation of a spatially localized excitation at the waveguide output or terminus.

In general, the dispersion relationship of an SPP is $kSPP=k_0 n_{eff}$, with $n_{eff}$ for the case of a planar or large cylindrical material interface given by Equation (1), $$n_{eff} = \sqrt{\frac{\varepsilon_1 \varepsilon_2}{\varepsilon_1 + \varepsilon_2}},$$

with dielectric function of the metal and surrounding dielectric, $\varepsilon_1$ and $\varepsilon_2$, respectively. For $Re(\varepsilon_1)<0$ and $|Re(\varepsilon_1)|>1$, as is the case for noble metals over abroad frequency range up to the visible spectrum, $kSPP>k_0$; i.e. momentum conservation prevents the coupling of SPP's to free spacelight and the SPP wave remains surface confined. However, since Im ($\varepsilon_1$) >0, Im(kSPP)>0 results in appreciable ohmic loss, and thus, SPP propagation attenuation.

For a radially symmetric (m=0) mode propagating on a cylindrical waveguide of radius r, $n_{eff}(r)$ can be calculated by solving the transcendental equation (Equation (2)), $$\frac{\varepsilon_1}{\kappa_1} \frac{I_1(k_0 \kappa_1 r)}{I_0(k_0 \kappa_1 r)} + \frac{\varepsilon_2}{\kappa_2} \frac{K_1(k_0 \kappa_2 r)}{K_0(k_0 \kappa_2 r)} = 0$$

with the modified Bessel functions Ij and Kj (j=0,1) and $\kappa i = \sqrt{n2_{eff}(r)} - \varepsilon i$. While higher order (m 1, 2, 3 . . . ) asymmetric mode solutions also exist, they do not experience the diverging $n_{eff}(r)$ with decreasing "r" necessary for nanofocusing. Instead these modes have a mode number dependent cut-off radius beyond which they cannot propagate.

Figure 12:
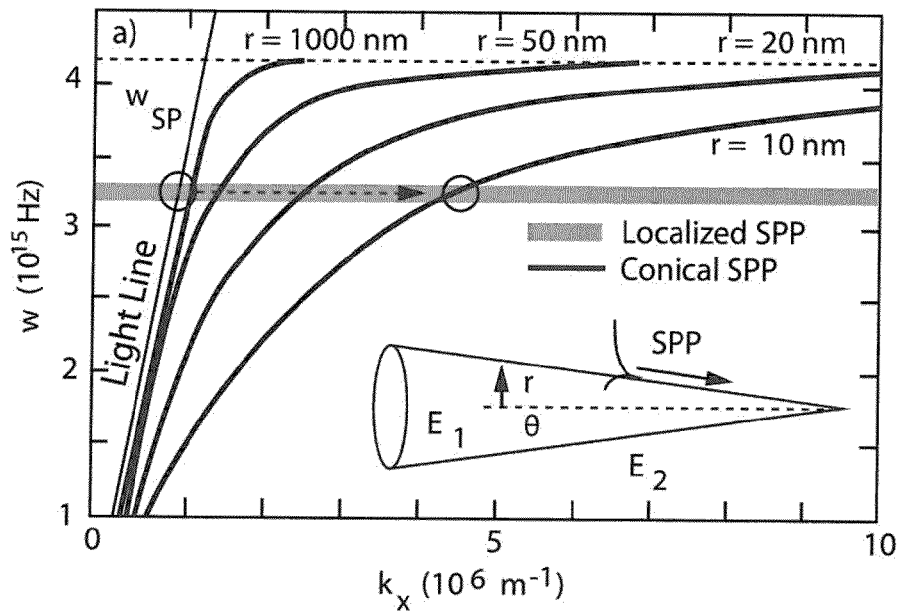
FIG. 12 is a plot of the dispersion relationship for SPPs propagating on a cylindrical waveguide.
Figure 13:
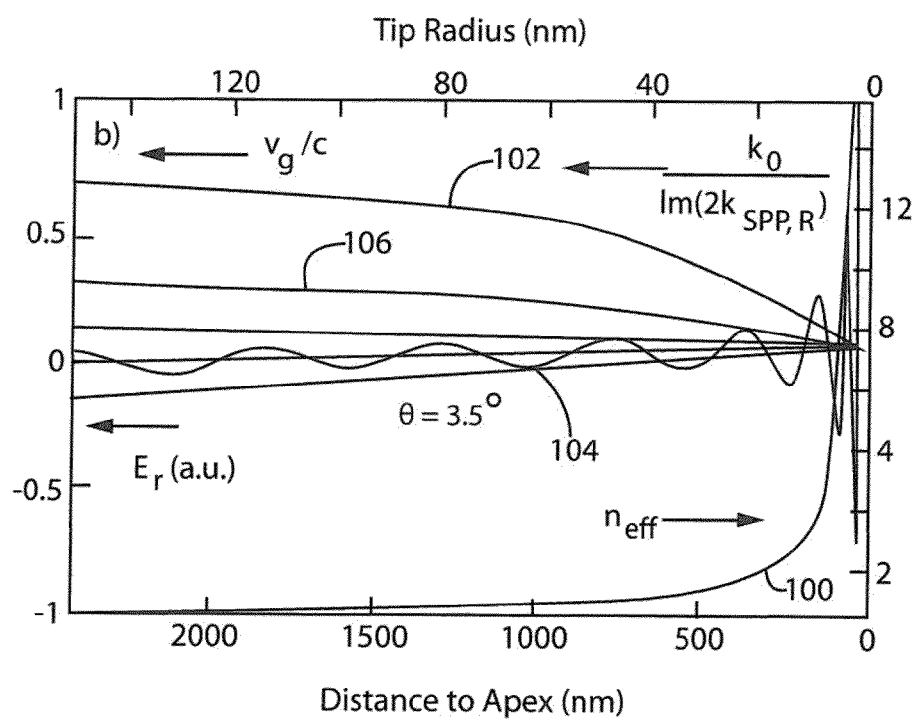
FIG. 13 is a plot corresponding to FIG. 12 of a normalized radial electric field at different locations.

Shown in FIG. 12 are the SPP dispersion relationships calculated from Eq. (2) using Drude parameters for Au, and air for different cone radii. The resulting continuous transformation of SPP's propagating on a tapered waveguide presents a highly efficient antenna concept. It can be seen that for all radii the SPP wavevector kSPP is larger than that of light in free space, with k-vectors increasing with decreasing radius. FIG. 13 shows the increase in $n_{eff}(r)$, labeled 100, for the m=0 mode calculated from Eq. (2) for the case of λ0=633 nm and a cone half-angle of θ=3.5° as an example. Associated with the divergence of $n_{eff}(r)$ is a decrease in the group velocity vg=dw/dk, labeled 102. This gives rise to a decrease in λSPP, as seen in the spatial evolution of the surface electric field down the cone, calculated from Stockman, M. I. Phys. Rev. Lett., 93, 137404 (2004), and taking into account propagation damping, labeled 104. Concomitantly, the index of refraction increase leads to a decrease of the spatial extent of the evanescent SPP field into the dielectric medium, given by 1/Im (2kSPP, r), labeled 106. This increases the spatial confinement of the mode on the waveguide. The combination of these effects leads to the concentration of the electric field into the cone apex, as seen in the rising electric field amplitude. (see Berweger II)

In the experimental implementation of 3D SPP nanofocusing, considerations arise in terms of the choice of waveguide fabrication method and the SPP launching mechanism used. Conical tips with smooth surfaces and uniform taper angles, such as those used in scanning probe applications, can be obtained by electrochemical etching from bulk wire. Alternatively, tips grown with electron-beam induced chemical vapor deposition are also suitable, but are more time and equipment-intensive to fabricate. Other approaches, for example utilizing template-stripping procedures, have also been demonstrated. Gold (Au) tips are preferably used, primarily due to the ambient stability of the metal and the ease of tip fabrication, though additional benefits could be gained through the use of Silver (Ag) as the waveguicling material. In Au, SPP propagation is associated with high losses near the resonant interband transition, which become especially pronounced for photon energies above ~2 eV. Using Ag as a waveguide material allows for low propagation losses and therefore higher nanofocusing efficiencies, but electrochemical etching methods provide challenges.

Figure 14:
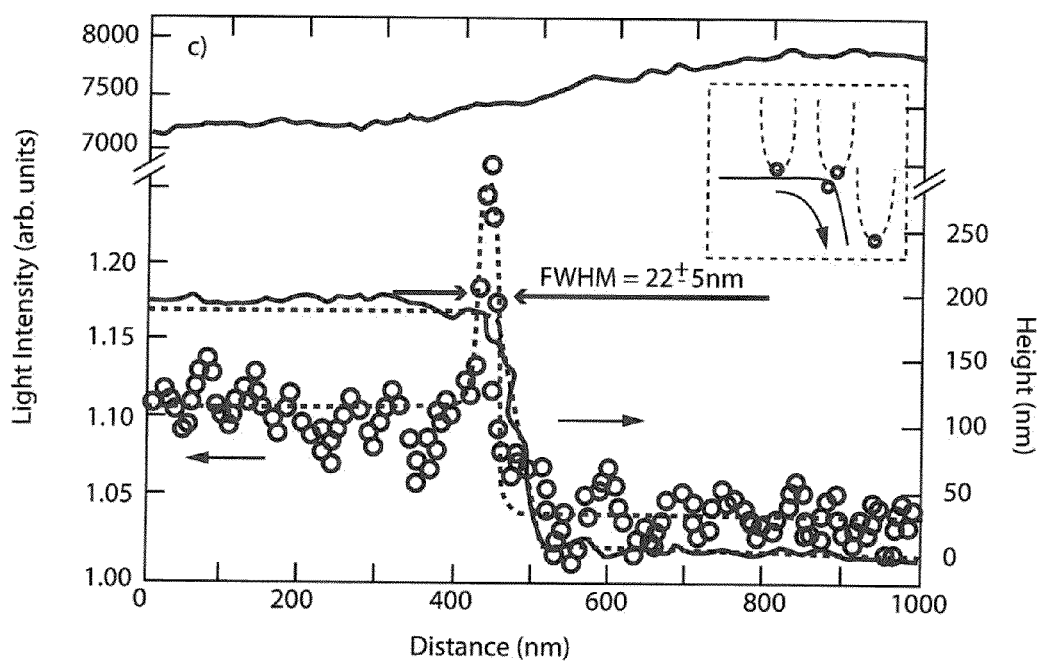
FIG. 14 is a plot of elastic scattered light as the AFM probe progresses over a sharp step edge of the sample, also illustrating the sample topography and the elastic scattered light when alternatively directly illuminating the tip apex, appropriately labeled Prior Art.

In order to overcome the momentum mismatch discussed above and launch SPP's onto these tips, the traditional methods of grating-coupling or attenuated total internal reflection (ATR) can be used, as well as photonic crystal elements or coupling from dielectric waveguides. The use of prism-based ATR coupling elements is difficult due to the geometric constraints of micron-scale SPP waveguides, and despite being possible, has thus far remained impractical. While end-on coupling between dielectric and plasmonic waveguides can in principle be highly efficient, this remains difficult in 3D structures due to the high positioning accuracy necessary at visible frequencies, and alternative methods such as coupling to SPP modes of a metallic cladding on a tapered waveguide suffer from poor mode overlap. In contrast to AIR geometries, grating coupling elements can readily be fabricated via focused ion beam milling (FIB) onto the shaft of nanofocusing waveguides and large theoretical coupling efficiencies are possible. An alternative approach has been to use a photonic crystal cavity to localize and couple SPPs onto the base of tip, which allows for a transmission-type geometry with facile alignment, but this suffers from residual hole-array transmission and far-field radiation superimposed with the apex field. The spatial confinement of optical fields achieved in such an antenna was established in a scanning probe geometry (as shown in FIG. 14—for the prior art shear force microscopy case) by using an ultrasharp step edge as an effective point scatterer and measuring the spatial extent of the apex field. From the scattering signal, a size of the nanofocus of ~22±5 nm was determined.

Measurements of emitted intensity indicate that 2-4% of the light initially incident on the grating within the coupling bandwidth is re-emitted at the apex of the tip. Despite the high loss during grating coupling and propagation, confined to a (20 nm) volume, this nevertheless represents a power density two orders of magnitude higher than a diffraction-limited focus with the same initial intensity.

The ability to generate a nano-localized optical excitation at the end of a scanning probe tip with high nanofocusing efficiency holds significant promise for background free near-field spectroscopy. In conventional s-SNOM implementations, the far-field focus, which is used to excite the scanning probe tip, will often generate a large background, so that demodulation techniques are necessary in order to extract the near-field signal, especially in linear s-SNOM. (see Berweger II)

Applications

As further outlined in Berweger II, background-free TERS is expected to be particularly useful for the study of crystalline systems, where the far-field Raman background is strong due to the extended material volume compared to a molecular monolayer. Remote-excitation TERS according to the preferred embodiments also holds promise for the full realization of the capabilities of nano-Raman spectroscopy for the study of, e.g., strain and domain formation in crystalline or molecular nanocomposite materials on nanometer length scales.

Additionally, spatially resolved imaging using elastic light scattering with no background can be achieved. This plasmonic nanofocusing s-SNOM has applications similar to, and in many cases complementary to, conventional s-SNOM. In particular, it will improve the capabilities of elastic light scattering and vibrational IR nano-spectroscopy to image, for example, domains in correlated electron materials and other spatial inhomogeneities such as phase separation in polymer blends.

Figure 15:
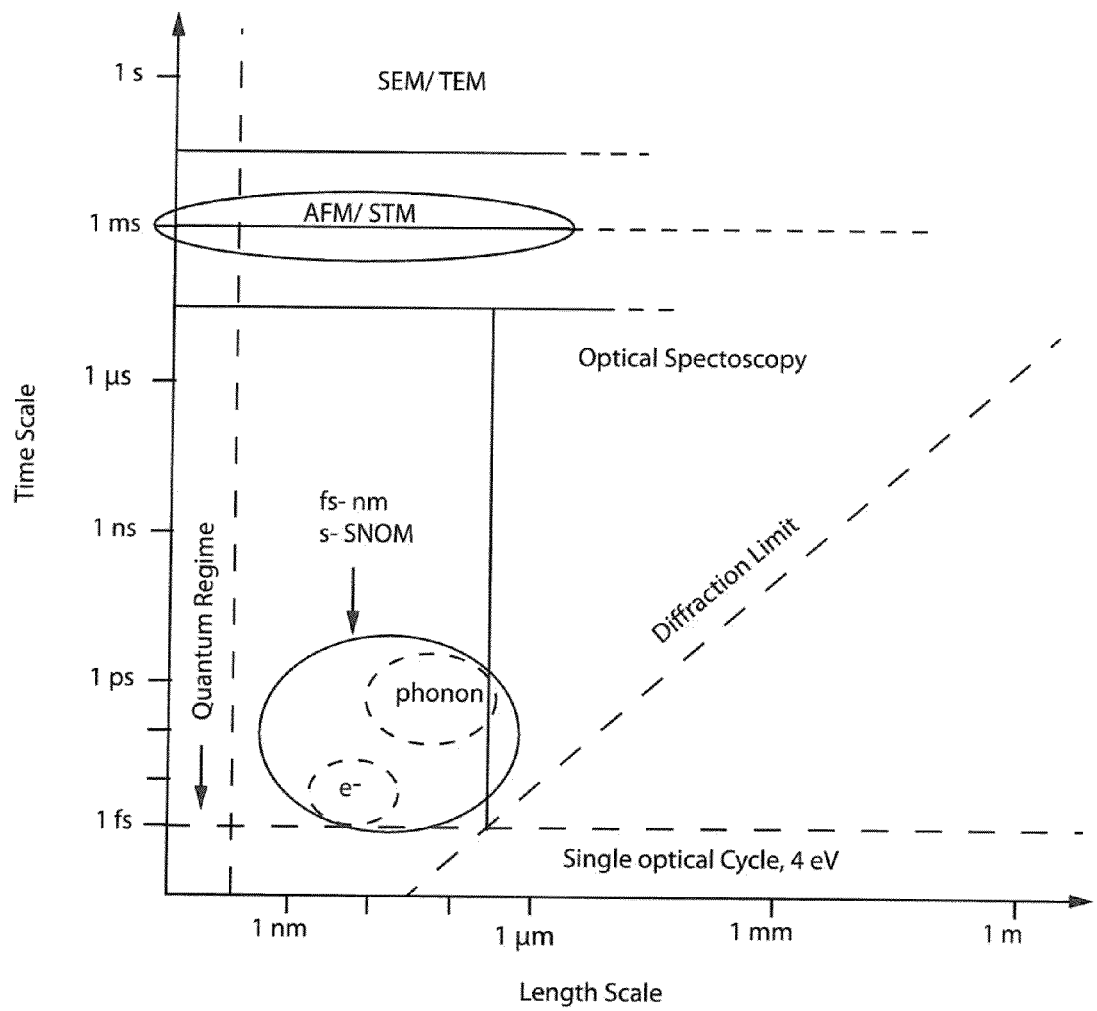
FIG. 15 is a plot illustrating the spatio-temporal regime of electronic and vibrational excitations in a sample, showing time resolution down to a single cycle with ultrafast optical microscopies, constrained by the diffraction limit.

Ultrafast spectroscopy with femtosecond pulses has enabled the study of matter on the characteristic time scales of the elementary electronic and vibrational excitations. Shaping the amplitude and phase of ultrafast pulses allows for coherent control of quantum systems. Extension of these techniques to the nanoscale through plasmonic nanofocusing will allow the all-optical study of the elementary excitations of matter not only on their characteristic time, but also length scales given by electronic and lattice correlations, as shown in FIG. 15. The approach would complement the related emerging capabilities of ultrafast electron and x-ray imaging. As an all-optical technique, by coupling directly to the electronic and nuclear degrees of freedom, it allows for the study and quantum coherent control of dynamic interactions in molecular and solid matter on the nanoscale, and at time scales down to the single cycle limit. The use of nanofocusing of SPP's into the nanometer apex of noble metal tips is compatible with implementations of a wide range of spectroscopic techniques. In addition to the improvements gained in TERS and elastic scattering measurements from efficient background suppression, the high nanofocusing efficiency and broad wavelength range allows the extension of the technique in principle to any wavemixing process, including multi-dimensional spectroscopies. Furthermore, the high nanoscale fields that can be generated at the tip apex are sufficient for electron emission via either multiphoton or optical tunneling processes. Strong associated field gradients and optical forces can be used for nanomanipulation and trapping. The control and localization of pulses could also be utilized for higher harmonic generation (HHG) using only high repetition rate Ti:Sa oscillator pulses. (see Berweger II)

Adiabatic tip-plasmon focusing can readily be extended to a range of wavelengths by adjusting the grating parameter and considering cone angle, SPP damping, and other wavelength-related parameters appropriately. Performing TERS at long wavelengths is desirable with reduced fluorescence and enhanced sample transparency in biological media. Nanofocusing is possible over a broad spectral range, determined by the wavelength-dependent SPP damping and related taper angle. For gold (Au) tips, guided by established etching procedures and ambient stability, the SPP propagation length given by $L=1/\text{Im}(k_{SPP})$, resulting from material damping, imposes a wavelength of $\lambda \cong 600$ nm as the lower practical limit ($L \cong 9$ μm) for silver tips, wavelengths down to $\lambda \cong 400$ nm can be used ($L \cong 10$ μm for $\lambda = 400$ nm). (see Berweger II)

In spectroscopy in general, and particularly for nanospectroscopy, the fundamental limit to sensitivity and emitter localization is often determined by the contrast (near-field to background signal ratio), where the background level is frequently difficult to remove. In TERS, the near-to far-field signal contrast is directly related to the degree and spatial extent of the near-field enhancement region relative to the far-field focus size. A high contrast and suppression of the far-field background can be achieved in various TERS geometries with a combination of large field enhancement and the use of high-NA optics, and can be further benefited by spatially dispersed sample material, yet is still practically constrained by the diffraction limit. In grating-coupling TERS, the far-field signal is negligible and principally of a different nature, as a consequence of the nonlocal excitation with no direct far-field sample irradiation and the effective suppression of any residual grating-scattered light via confocal spatial filtering. It is of note that the unique background suppression mechanism of grating-coupling TERS is effective without the need for high-NA optics or large field-enhancement values.

Further improvement in the technique can be achieved by refining the excitation and detection geometry, particularly the use of confocal filtering in combination with a high-NA objective in an axial detection scheme, as well as optimized grating parameters, incident angle, and apex-grating separation distance.

Also, conventional cantilever AFM tips can be used after metal coating. Through the use of compatible high-NA axial detection scheme for transparent samples, improved signal collection can be achieved. Moreover, the application in liquid environments typically requires the modification of grating parameters, and/or incident angle, for efficient grating-coupling given that SPPs propagating across a liquid-air interface can possibly experience scattering and reflection losses. Efficient adiabatic plasmon nanofocusing in monolithic Au scanning probe tips for TERS allows for the extension of TERS in the near-IR, as demonstrated for $\lambda = 800$ nm. The spatial separation of the far-field grating-coupling of the radiation and the propagation-induced near-field apex localization allows for an improvement in near to far-field contrast in TERS with effective suppression of the far-field background with multiple excitation wavelengths. Moreover, this capability for nonlocal generation of a nanoscale excitation source with true nanofocusing efficiency and intrinsic background suppression facilitates a wide range of spectroscopic techniques. (see Breweger II)

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

What is claimed is:

1. An SPM including:
    a probe including a cantilever and a tip, the tip positioned at a distal end of the cantilever and including a) a shaft and, b) an apex positioned adjacent to a sample;
    a receiving element supported by the shaft of the tip;
        a source of electromagnetic wave excitation that directs electromagnetic waves toward the receiving element, the electromagnetic waves being coupled to the apex via the receiving element, and wherein the coupled electromagnetic waves at the apex yield locally enhanced excitation that interacts with the sample; and
        a controller that maintains a separation between the apex and the sample greater than zero nanometers and less than 100 nm during electromagnetic wave excitation.

2. The SPM of claim 1, wherein the separation is maintained at less than 10 nm during electromagnetic wave excitation.

3. The SPM of claim 1, wherein the controller maintains the separation using one of torsional resonance mode (TR Mode) feedback and contact mode feedback.

4. The SPM of claim 1, wherein the controller maintains the separation at less than 5 nm using tapping mode, wherein a tapping mode setpoint amplitude is between about 0.1 nm and 10 nm.

5. The SPM of claim 1, wherein the shaft has a continuous surface around its entire periphery.

6. The SPM of claim 5, wherein the continuous surface is at least one of a conical surface and an elliptical surface.

7. The SPM of claim 1, wherein the receiving element is supported by the tip and is one of a surface grating, a prism, a photonic crystal, a waveguide, and an optical antenna.

8. The SPM of claim 1, wherein the apex comprises a conductive metal, and has a radius between about 1 and 100 nm.

9. The SPM of claim 8, wherein the apex is made of silicon and includes a metal coating.

10. The SPM of claim 9, wherein the metal coating is at least one of Au, Ag and Al.

11. The SPM of claim 1, wherein the tip has a height greater than 15 microns.

12. The SPM of claim 1, wherein the source of electromagnetic wave excitation is one of a) a laser operated at a wavelength in the UV or near-IR spectral range (about 300 nm to 1200 um), and b) an IR source operating at a wavelength equal to about 2-30 μm.

13. The SPM of claim 1, wherein the locally enhanced signals are used in at least one of a spectroscopic measurement and a nano-Imaging measurement.

14. A method for optically measuring a physical property of a sample, the method including:
    providing an AFM including a probe having a cantilever and a tip supported at about a distal end of the cantilever, the tip including a shaft and an apex;
    providing a receiving element supported by the shaft of the tip;
    providing a source of electromagnetic wave excitation;
    directing electromagnetic waves from the source toward the receiving element;
    coupling the electromagnetic waves from the receiving element to the apex to produce locally enhanced excitation that interacts with the sample; and
    controlling a separation between the apex and the sample to be greater than zero nanometers and less than 100 nm during electromagnetic wave excitation.

15. The method of claim 14, wherein the controlling step maintains the separation using at least one of a) torsional resonance mode (TR Mode) feedback, and b) tapping mode feedback, wherein a setpoint amplitude associated with the tapping mode feedback is between about 0.1 nm and 10 nm.

16. The method of claim 14, wherein the receiving element provides adiabatic plasmon focusing to produce the locally enhanced signals and is at least one of a surface grating, a prism, a photonic crystal, a waveguide, and an optical antenna.

17. The method of claim 14, wherein the probe is made of a material that is conductive at optical wavelengths.

18. The method of claim 14, wherein the source of electromagnetic wave excitation is one of a) a laser operated at a wavelength in the UV or near-IR spectral range (about 300 nm to 1200 nm), and h) an IR source operating at a wavelength equal to about 2-30 μm.

19. The method of claim 14, wherein the controlling step maintains the separation at less than 5 nm using at least one of torsional resonance mode (TR Mode) and tapping mode operated at a setpoint amplitude between about 0.1 nm and 10 nm.

20. An SPM including:
- a probe including a cantilever with a tip, the tip having a shaft and an apex;
- a receiving element supported by the probe,
- a remote source of electromagnetic wave excitation that directs electromagnetic waves toward the receiving element, the receiving element providing adiabatic plasmon focusing of the electromagnetic waves to excite the apex and produce locally enhanced excitation that is coupled to a sample, the locally enhanced excitation being comprised entirely of the focused electromagnetic waves; and
- a controller that maintains a separation between the apex and the sample greater than zero nanometers and less than 100 nm.

* * * * *